US010854393B2

United States Patent
Koseki et al.

(10) Patent No.: US 10,854,393 B2
(45) Date of Patent: Dec. 1, 2020

(54) ELECTROLYTIC CAPACITOR AND MANUFACTURING METHOD THEREFOR (71) Applicant: NIPPON CHEMI-CON CORPORATION, Tokyo (JP)

(72) Inventors: Kazuya Koseki, Tokyo (JP); Kenji Machida, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 2 days.

(21) Appl. No.: 16/090,078

(22) PCT Filed: Mar. 30, 2017

(86) PCT No.: PCT/JP2017/013331
§ 371 (c)(1),
(2) Date: Sep. 28, 2018

(87) PCT Pub. No.: WO2017/170902
PCT Pub. Date: Oct. 5, 2017

(65) Prior Publication Data
US 2019/0115160 A1 Apr. 18, 2019

(30) Foreign Application Priority Data

Mar. 31, 2016 (JP) ................................ 2016-072664
Jan. 13, 2017 (JP) ................................ 2017-003881

(51) Int. Cl.
*H01G 9/042* (2006.01)
*H01G 9/035* (2006.01)
(Continued)

(52) U.S. Cl.
CPC ......... *H01G 9/0425* (2013.01); *H01G 9/0029* (2013.01); *H01G 9/028* (2013.01);
(Continued)

(58) Field of Classification Search
CPC ........ H01G 11/60; H01G 11/04; H01G 11/24; H01G 11/64; H01G 9/0425; H01G 9/0029;
(Continued)

(56) References Cited

U.S. PATENT DOCUMENTS 7,006,348 B1 2/2006 Ueda et al.
2006/0018078 A1* 1/2006 Fujimoto ................. H01G 9/04
361/271

(Continued)

FOREIGN PATENT DOCUMENTS

JP 3-112116 A 5/1991
JP 3-37293 B2 6/1991

(Continued)

OTHER PUBLICATIONS

International Search Report for PCT/JP2017/013331 (PCT/ISA/210) dated Jun. 27, 2017.

(Continued)

*Primary Examiner* — Michael P McFadden
(74) *Attorney, Agent, or Firm* — Birch, Stewart, Kolasch & Birch, LLP (57) ABSTRACT

Provided is an electrolytic capacitor having a cathode that exhibits a high capacity. The electrolytic capacitor includes: a cathode having a conductive substrate and a conductive polymer layer placed on a surface of the conductive substrate; an anode having a substrate composed of a valve metal and a dielectric layer composed of an oxide of the valve metal that is placed on the surface of the substrate and is so placed that the dielectric layer and the conductive polymer layer of the cathode face each other through a space; and an ion-conductive electrolyte filled in the space, in which the conductive polymer layer of the cathode that is in contact with the ion-conductive electrolyte expresses a
(Continued)

redox capacity by applying a voltage between the anode and the cathode.

18 Claims, 3 Drawing Sheets

(51) Int. Cl.
*H01G 9/052* (2006.01)
*H01G 9/145* (2006.01)
*H01G 9/028* (2006.01)
*H01G 9/00* (2006.01)
*H01G 9/045* (2006.01)

(52) U.S. Cl.
CPC ............ *H01G 9/035* (2013.01); *H01G 9/045* (2013.01); *H01G 9/052* (2013.01); *H01G 9/145* (2013.01)

(58) Field of Classification Search
CPC ........ H01G 9/028; H01G 9/035; H01G 9/045; H01G 9/052; H01G 9/145
See application file for complete search history.

(56) References Cited

U.S. PATENT DOCUMENTS

| | | |
|---|---|---|
| 2009/0296317 A1 | 12/2009 | Naoi et al. |
| 2010/0073850 A1 | 3/2010 | Fujimoto |
| 2010/0302709 A1 | 12/2010 | Dreissig et al. |
| 2013/0070393 A1 | 3/2013 | Kamiyama et al. |
| 2013/0141841 A1 | 6/2013 | Dreissig et al. |
| 2013/0242465 A1* | 9/2013 | Weaver .................. H01G 9/145 361/504 |
| 2016/0148757 A1* | 5/2016 | Djebara ................. H01G 9/145 607/119 |
| 2016/0351340 A1* | 12/2016 | Uka .......................... H01G 9/04 |

FOREIGN PATENT DOCUMENTS

| | | |
|---|---|---|
| JP | 7-283086 A | 10/1995 |
| JP | 2000-269070 A | 9/2000 |
| JP | 2001-196270 A | 7/2001 |
| JP | 2010-74089 A | 4/2010 |
| WO | 2006/132141 A1 | 12/2006 |

OTHER PUBLICATIONS

Written Opinion of the International Searching Authority for PCT/JP2017/013331 (PCT/ISA/237) dated Jun. 27, 2017.
European Patent Office Communication and extended search report issued in the corresponding European Patent Application No. 17775436.3 dated Oct. 10, 2019.

* cited by examiner

Cathode Substrate and Conductive Polymer Layer

ELECTROLYTIC CAPACITOR AND MANUFACTURING METHOD THEREFOR

TECHNICAL FIELD

The present invention relates to an electrolytic capacitor provided with a cathode that exhibits a high capacity and a production method therefor.

THE RELATED ART

An electrolytic capacitor having an ion-conductive electrolyte (including an electrolytic liquid) generally has a structure where an anode having an oxide layer as a dielectric layer that is placed on the surface of a foil composed of a valve metal such as aluminum, tantalum and niobium, a cathode for power collection that is composed of a valve metal foil or the like (an apparent cathode), and a separator that is placed between the anode and the cathode and holds the ion-conductive electrolyte as a true cathode are housed in a sealed case, and the electrolytic capacitors having a rolled or stacked structure are extensively employed.

This electrolytic capacitor has advantages over a plastic capacitor, a mica capacitor, etc. in terms of compactness and large capacity, and thickening the oxide layer of the anode can improve the dielectric breakdown voltage of the capacitor. However, thickening the oxide layer of the anode lowers the capacity of the electrolytic capacitor and thus some of the advantages of compactness and large capacity thereof are lost. Therefore, various studies have been undertaken to improve the capacity of the electrolytic capacitor without lowering the dielectric breakdown voltage thereof. For example, studies have been done to control the conditions under which the valve metal foils for the anode and the cathode are chemically or electrochemically etched for the purpose of effectively increasing the surface area of these valve metal foils to enhance the capacities of not only the anode but also the cathode.

Also, Patent Document 1 (JP H3-37293 B) discloses a cathode material in order to solve a problem where excessive etching of an aluminum foil in an aluminum electrolytic capacitor simultaneously leads to the dissolution of the surface of the aluminum foil into the etching solution and to the prevention of an increase in the surface area of the foil, and thus the increase in the capacity of the cathode by means of etching is limited. The cathode material has an aluminum foil in which a surface of the aluminum foil is adequately roughened and is covered with a 0.2 to 5.0 µm thick titanium evaporated film having fine particles of titanium with an average size of 0.02 to 1.0 µm that are formed under an inert atmosphere such as argon and helium. With this cathode material, the surface of the titanium evaporated film is minutely roughened so that an increase in the surface area of the cathode material is achieved and thus an increase in the capacity of the aluminum electrolytic capacitor is achieved. Also, the titanium evaporated film provides a highly durable cathode material.

PRIOR ARTS DOCUMENTS

Patent Documents

Patent Document 1: JP H3-37293 B

SUMMARY OF THE INVENTION

Problems to be Solved by the Invention

However, there is always an ongoing need to improve the capacity per unit volume of an electrolytic capacitor without lowering the dielectric breakdown voltage thereof. This need can be met if the capacity of the cathode can be significantly increased. Downsizing of the electrolytic capacitor can be achieved if the electrolytic capacitor has the same rated capacity because the size of the cathode or the anode can be lowered. Also, capacity growth can be achieved if the electrolytic capacitor has the same volume because the capacity of the electrolytic capacitor can be increased.

Therefore, the objective of the present invention is to provide an electrolytic capacitor with a cathode that can realize a high capacity, which can meet the need for downsizing and capacity growth by increasing the capacity per unit volume of the electrolytic capacitor, and a production method therefor.

Means for Solving Problems

The inventors, after keen examination, found that, if an electrolytic capacitor is constructed by using a cathode in which a conductive polymer layer is formed on a conductive substrate, the conductive polymer layer that comes into contact with an ion-conductive electrolyte will express a redox capacity, and the capacity per unit volume of the electrolytic capacitor can be significantly increased, and therefore completed the present invention.

Therefore, the present invention relates to an electrolytic capacitor comprising:

a cathode comprising a conductive substrate and a conductive polymer layer placed on a surface of the conductive substrate;

an anode comprising a substrate composed of a valve metal and a dielectric layer composed of an oxide of the valve metal that is placed on the surface of the substrate and is so placed that the dielectric layer and the conductive polymer layer of the cathode face each other through a space; and an ion-conductive electrolyte filled in the space, wherein the conductive polymer layer of the cathode that is in contact with the ion-conductive electrolyte expresses a redox capacity by applying a voltage between the anode and the cathode.

The cathode with the conductive polymer layer in the electrolytic capacitor of the present invention shows a significantly increased capacity due to the expression of a redox capacity compared with a cathode without a conductive polymer layer, and thus significantly increases the capacity per unit volume of the electrolytic capacitor. To express the redox capacity, the conductive polymer layer of the cathode needs to be in direct contact with the ion-conductive electrolyte, but the dielectric layer of the anode can be either in direct contact with the ion-conductive electrolyte, or in indirect connection with the ion-conductive electrolyte through the intermediary of another conductive material. Further, the ion-conductive electrolyte can be held in place by the separator. It is preferable that the conductive substrate of the cathode has an evaporated titanium film and the conductive polymer layer is placed on the surface of the evaporated titanium film, as the evaporated titanium film produces a durable cathode.

For the conductive polymer layer that is formed on the surface of the conductive substrate of the cathode, a conductive polymer induced by a publicly known monomer that has a π-conjugated double bond can be used without limitations, and it is preferable that the conductive polymer layer is composed of poly(3,4-ethylenedioxythiophene) (hereinafter, 3,4-ethylenedioxythiophene is referred to as EDOT and poly(3,4-ethylenedioxythiophene) is referred to as PEDOT). PEDOT can be suitably used in the present invention as it shows a high redox activity and has excellent heat resistance.

By using the cathode with a thin conductive polymer layer, the size of the anode or cathode can be reduced, and thus the capacity per unit volume of the electrolytic capacitor can be increased. The thickness of the conductive polymer layer of the cathode is preferably within a range of 200 to 2450 nm. If the thickness of the conductive polymer layer is less than 200 nm, its high-temperature endurance tends to be lower, and if the thickness of the conductive polymer layer is more than 2450 nm, the temperature dependence of the capacity increases and the thickness of the conductive polymer layer is less likely to contribute to the downsizing of the electrolytic capacitor.

The conductive polymer layer on the conductive substrate of the cathode may be formed by electropolymerization or chemical polymerization, or may be formed by applying a dispersion liquid containing particles of a conductive polymer to the surface of the conductive substrate, but it is preferable that the conductive polymer layer is formed by electropolymerization. By electropolymerization, a conductive polymer layer with excellent mechanical strength can be formed in a short period of time on the surface of the substrate by using a small quantity of monomers. Also, electropolymerization forms a thin, dense and even conductive polymer layer, and a suitable conductive polymer layer with a thickness within the range of 200 to 2450 nm can be easily obtained.

The present invention also relates to a method for preparing the electrolytic capacitor of the present invention comprising:

a cathode-forming step of forming a conductive polymer layer on a surface of a conductive substrate for obtaining a cathode for the electrolytic capacitor;

an anode-forming step of oxidizing a surface of a substrate composed of a valve metal to form a dielectric layer composed of an oxide of the valve metal for obtaining an anode for the electrolytic capacitor; and an electrolyte-filling step of making the conductive polymer layer of the cathode and the dielectric layer of the anode face each other through a space and filling an ion-conductive electrolyte in the space. In this method, it is preferable to form the conductive polymer layer by electropolymerization in the cathode-forming step.

Advantageous Effects of the Invention

In the electrolytic capacitor of the present invention, the conductive polymer layer of the cathode that is in contact with the ion-conductive electrolyte expresses a redox capacity by applying a voltage between the anode and cathode, and the capacity per unit volume of the electrolytic capacitor increases remarkably. Therefore, downsizing and capacity growth of the electrolytic capacitor can be achieved.

DETAILED DESCRIPTION OF THE INVENTION

An electrolytic capacitor of the present invention comprises:

a cathode comprising a conductive substrate and a conductive polymer layer placed on a surface of the conductive substrate;

an anode comprising a substrate composed of a valve metal and a dielectric layer composed of an oxide of the valve metal that is placed on the surface of the substrate and is so placed that the dielectric layer and the conductive polymer layer of the cathode face each other through a space; and an ion-conductive electrolyte filled in the space. The conductive polymer layer of the cathode that is in contact with the ion-conductive electrolyte expresses a redox capacity by applying a voltage between the anode and the cathode, and therefore the capacity per unit volume of the electrolytic capacitor remarkably increases. This capacitor can be manufactured by a cathode-forming step, an anode-forming step and an electrolyte-filling step, as shown below. Each step will be discussed in detail below.

(1) Cathode-Forming Step

The cathode in the electrolytic capacitor of the present invention comprises the conductive substrate and the conductive polymer layer placed on the surface of the conductive substrate. Any material can be used as the conductive substrate without particular limitation as long as it can be used as a current collector. For example, a foil of a valve metal such as aluminum, tantalum, niobium, titanium and zirconium or a foil of such a valve metal whose surface area is increased by a chemical or electrochemical etching process, that are used for a cathode in a conventional electrolytic capacitor, can be used as the substrate. These foils may have an oxidized film on the surface thereof. Also, the substrate in which a conductive material such as carbon, titanium, platinum, gold, silver, cobalt, nickel and iron is laminated by a method such as vacuum deposition, sputtering, ion plating and coating on the surface of the foil of a valve metal or the surface of the oxidized film on the foil of a valve metal may also be suitably used. The oxidized film on the foil of a valve metal may be a naturally oxidized film or may be a film formed by chemical conversion treatment with a chemical conversion solution such as an aqueous ammonium borate solution, an aqueous ammonium adipate solution and an aqueous ammonium phosphate solution. Further, an alloy such as an aluminum copper alloy may be used as the conductive substrate.

Aluminum is preferable as a valve metal. Also, a substrate in which a titanium film is laminated on the surface of the aluminum foil to which an etching process is applied as necessary or the surface of the oxidized aluminum film of the aluminum foil is preferable as it produces the cathode with excellent durability. Vapor deposition is a preferable method of forming the titanium film. The titanium film can contain an atom that exists in the surrounding atmosphere during the vapor deposition process: for example, nitrogen or carbon. The titanium film containing carbon is especially preferable as it produces a polymerized film having a stable property during the subsequent electropolymerization process.

The conductive polymer layer is placed on the surface of the substrate. This conductive polymer layer may be an electropolymerized film or a chemically polymerized film. The conductive polymer layer may also be formed by using a dispersion liquid which contains at least particles of a conductive polymer and a dispersion medium.

An electropolymerized film is formed by introducing the substrate and a counter electrode to a polymerization liquid that contains at least a monomer, supporting electrolyte and solvent and applying a voltage between the substrate and the counter electrode. A plate or net of platinum, nickel, steel or the like can be used to form the counter electrode. During the course of electropolymerization, an anion released from the supporting electrolyte will be captured in the conductive polymer layer as a dopant.

As a solvent of the polymerization liquid for electropolymerization, a solvent that can dissolve the desired amount of monomer and supporting electrolyte and does not negatively affect electropolymerization can be used without any limitations. Examples of the solvent are: water, methanol, ethanol, isopropanol, butanol, ethylene glycol, acetonitrile, butyronitrile, acetone, ethyl methyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane, and dimethylsulfolane. These solvents can be used alone or in a mixture of two kinds or more. A solvent that contains water in an amount of 80% by mass or more of the entire solvent, or especially a solvent that consists of water only, is preferable because its usage forms a dense and stable electropolymerized film.

A monomer with a π-conjugated double bond that has been conventionally used for the manufacture of a conductive polymer can be used as a monomer in the polymerization liquid for electropolymerization. Below are examples of representative monomers. These monomers can be used alone or in a mixture of two kinds or more.

First, thiophene and thiophene derivatives, including 3-alkylthiophenes such as 3-methylthiophene and 3-ethylthiophene, 3,4-dialkylthiophenes such as 3,4-dimethylthiophene and 3,4-diethylthiophene, 3-alkoxythiophenes such as 3-methoxythiophene and 3-ethoxythiophene, 3,4-dialkoxythiophenes such as 3,4-dimethoxythiophene and 3,4-diethoxythiophene, 3,4-alkylenedioxythiophenes such as 3,4-methylenedioxythiophene, EDOT and 3,4-(1,2-propylenedioxy)thiophene, 3,4-alkyleneoxythiathiophenes such as 3,4-methyleneoxythiathiophene, 3,4-ethyleneoxythiathiophene and 3,4-(1,2-propyleneoxythia)thiophene, 3,4-alkylenedithiathiophenes such as 3,4-methylenedithiathiophene, 3,4-ethylenedithiathiophene, and 3,4-(1,2-propylenedithia)thiophene, and alkylthieno[3,4-b]thiophenes such as thieno[3,4-b]thiophene, isopropylthieno[3,4-b]thiophene and t-butyl-thieno[3,4-b]thiophene, can be used.

Also, pyrrole and pyrrole derivatives, including N-alkylpyrroles such as N-methylpyrrole and N-ethylpyrrole, 3-alkylpyrroles such as 3-methylpyrrole and 3-ethylpyrrole, 3-alkoxypyrroles such as 3-methoxypyrrole and 3-ethoxypyrrole, N-phenylpyrrole, N-naphthylpyrrole, 3,4-dialkylpyrroles such as 3,4-dimethylpyrrole and 3,4-diethylpyrrole, and 3,4-dialkoxypyrroles such as 3,4-dimethoxypyrrole and 3,4-diethoxypyrrole can be used. Further, aniline and aniline derivatives, including 2,5-dialkylanilines such as 2,5-dimethylaniline and 2-methyl-5-ethylaniline, 2,5-dialkoxyanilines such as 2,5-dimethoxyaniline and 2-methoxy-5-ethoxyaniline, 2,3,5-trialkoxyanilines such as 2,3,5-trimethoxyaniline and 2,3,5-triethoxyaniline and 2,3,5,6-tetraalkoxyanilines such as 2,3,5,6-tetramethoxyaniline and 2,3,5,6-tetraethoxyaniline, or furan and furan derivatives, including 3-alkylfurans such as 3-methylfuran and 3-ethylfuran, 3,4-dialkylfurans such as 3,4-dimethylfuran and 3,4-diethylfuran, 3-alkoxyfurans such as 3-methoxyfuran and 3-ethoxyfuran and 3,4-dialkoxyfurans such as 3,4-dimethoxyfuran and 3,4-diethoxyfuran can be used.

It is preferable to use a monomer selected from a group consisting of thiophenes having substituents at the 3- and 4-positions. The substituents at the 3- and 4-positions of the thiophene ring may form a ring together with the carbons at the 3- and 4-positions. Especially, EDOT is preferable because it produces PEDOT that expresses a high redox capacity and has excellent heat resistance.

A chemical compound which releases a dopant that is contained in a conventional conductive polymer can be used as a supporting electrolyte in the polymerization liquid for electropolymerization without particular limitation. For example, inorganic acids such as boric acid, nitric acid, phosphoric acid, tungstophosphoric acid and molybdophosphoric acid, organic acids such as acetic acid, oxalic acid, citric acid, ascorbic acid, tartaric acid, squaric acid, rhodizonic acid, croconic acid and salicylic acid, sulfonic acids such as methanesulfonic acid, dodecylsulfonic acid, trifluoromethanesulfonic acid, p-toluenesulfonic acid, dodecylbenzenesulfonic acid, 1,2-dihydroxy-3,5-benzenedisulfonic acid, naphthalenesulfonic acid, naphthalenedisulfonic acid, propylnaphthalenesulfonic acid and butylnaphthalenesulfonic acid, and salts thereof can be used. Also, polycarboxylic acids such as polyacrylic acid, polymethacrylic acid and polymaleic acid, polysulfonic acids such as polystyrenesulfonic acid and polyvinylsulfonic acid, and salts thereof can be used as the supporting electrolyte.

Also, a boron complex such as borodisalicylic acid, borodioxalic acid, borodimalonic acid, borodisuccinic acid, borodiadipic acid, borodimaleic acid, borodiglycolic acid, borodilactic acid, borodihydroxyisobutyric acid, borodimalic acid, boroditartaric acid, borodicitric acid, borodiphthalic acid, borodihydroxybenzoic acid, borodimandelic acid and borodibenzilic acid, or salts thereof can be used as the supporting electrolyte. Also, a sulfonylimidic acid represented by Formula (I) or Formula (II)

where m is an integer from 1 to 8, preferably 1 to 4, and especially preferably 2, n is an integer from 1 to 8, preferably an integer 1 to 4, and especially preferably 2, and o is an integer 2 or 3, or salts thereof can be used as the supporting electrolyte.

For the salt, an alkali metal salt such as lithium salt, sodium salt and potassium salt, an ammonium salt, an alkyl ammonium salt such as ethyl ammonium salt and butyl ammonium salt, a dialkylammonium salt such as diethylammonium salt and dibutylammonium salt, a trialkylammonium salt such as triethylammonium salt and tributylammonium salt, and a tetraalkylammonium salt such as tetraethylammonium salt and tetrabutylammonium salt can be used.

These supporting electrolytes can be used alone or a mixture of two kinds or more can be used. Depending on the kind of supporting electrolyte(s) used, the supporting electrolyte can be used at a concentration that is the saturation solubility or less for the polymerization liquid and that gives enough current for electropolymerization, preferably at a concentration of 10 mmol or more per liter of water. It is preferable to use the boron complexes or salts thereof, preferably borodisalicylic acid and a salt thereof when a thiophene monomer with substituents at the 3- and 4-positions, preferably EDOT, is electropolymerized in a solvent that contains a large amount of water, preferably a solvent that only contains water, because a conductive polymer with excellent thermal stability can be formed using these constituents.

Electrolytic polymerization is performed by any one of a potentiostatic method, a galvanostatic method or a potential sweep method. In the case of the potentiostatic method, a potential of 1.0 to 1.5 V for a saturated calomel electrode is preferable though this depends on the type of monomer; and in the case of the galvanostatic method, a current value of 1 to 10000 µA/cm² is preferable though this depends on the type of monomer; and in the case of the potential sweep method, it is preferable to sweep a range of 0 to 1.5 V for a saturated calomel electrode at a velocity of 5 to 200 mV/s though this depends on the type of monomer. By electrolytic polymerization, the conductive polymer layer is formed on the substrate preferably at a thickness of 200 to 2450 nm. The polymerization temperature has no strict restriction, but generally it is within a range of 10 to 60 degrees centigrade. The polymerization time has no strict restriction, but generally it is within a range of 1 minute to 10 hours.

A chemical polymerized film can be formed by a method of preparing a solution where both a monomer and an oxidant are dissolved in a solvent, applying this solution to the surface of the conductive substrate by a process such as brush application, drop application, immersion application and spray application and then drying the conductive substrate, or, by a method of preparing a solution where a monomer is dissolved in a solvent and a solution where an oxidant is dissolved in a solvent, applying these solutions alternately on the surface of the conductive substrate by a process such as brush application, drop application, immersion application and spray application and then drying the conductive substrate. As the solvent, for example, water, methanol, ethanol, isopropanol, butanol, ethylene glycol, acetonitrile, butyronitrile, acetone, ethyl methyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane and dimethyl sulfolane can be used. These solvents can be used alone or a mixture containing more than one solvent can be used. As the monomer, a monomer that has a π-conjugated double bond, such as a monomer exemplified for electropolymerization can be used. These monomers can be used alone or a mixture containing more than one monomer can be used. It is preferable to use a monomer selected from thiophenes having substituents at the 3- and 4-positions, especially EDOT. As the oxidant, a trivalent iron salt such as iron (III) p-toluenesulfonate, iron (III) naphthalene sulfonate and iron (III) anthraquinonesulfonate, or a persulfate salt such as ammonium peroxodisulfate and sodium peroxodisulfate can be used. As the oxidant, a single compound can be used, or two or more kinds of compound can be used. The polymerization temperature has no strict restriction, but generally it is within a range of 10 to 60 degrees centigrade. The polymerization time has no strict restriction, but generally it is within a range of 1 minute to 10 hours.

Further, it is possible to form the conductive polymer layer by applying a dispersion liquid that contains at least particles of a conductive polymer and a dispersion medium to the surface of the conductive substrate by a process such as coating and dropping and then drying the surface of the conductive substrate. As the dispersion medium in the dispersion liquid, for example, water, methanol, ethanol, isopropanol, butanol, ethylene glycol, acetonitrile, butyronitrile, acetone, ethyl methyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane and dimethyl sulfolane can be used, and it is preferable to use water as the dispersion medium. The dispersion liquid can be obtained, for example, by adding a monomer, an acid that releases a dopant or a salt thereof, and an oxidant to water, agitating the mixture until chemical oxidative polymerization is complete, then removing the oxidant and the residual monomer by a refining method such as ultrafiltration, cation exchange or anion exchange, and applying dispersion treatment such as ultrasonic dispersion treatment, high-speed fluid dispersion treatment or high-pressure dispersion treatment to the mixture as necessary. The dispersion liquid can also be obtained by adding a monomer and an acid that releases a dopant or a salt thereof to water, performing electrolytic oxidation polymerization while agitating the mixture, then removing the residual monomer by a refining method such as ultrafiltration, cation exchange or anion exchange, and applying dispersion treatment such as ultrasonic dispersion treatment, high-speed fluid dispersion treatment or high-pressure dispersion treatment to the mixture as necessary. The dispersion liquid can further be obtained by filtrating the fluid obtained either by chemical oxidative polymerization or electrolytic oxidation polymerization, separating aggregates, sufficiently washing the aggregates and adding the aggregates to water, and applying dispersion treatment such as ultrasonic dispersion treatment, high-speed fluid dispersion treatment or high-pressure dispersion treatment to the mixture. The amount of the conductive polymer particles contained in the dispersion liquid is generally within a range of 1.0 to 3.0% by mass, preferably within the range of 1.5 to 2.0% by mass.

By using a cathode with a thin conductive polymer layer, the size of the cathode can be reduced, and consequently, the capacity per unit volume of the capacitor can be improved. The thickness of the conductive polymer layer of the cathode is preferably within a range of 200 to 2450 nm. If the thickness of the conductive polymer layer is less than 200 nm, its high-temperature endurance tends to decrease, and if the thickness of the conductive polymer layer is more than 2450 nm, the temperature dependence of the capacity is increased and the thickness of the conductive polymer layer is less likely to contribute to the downsizing of the electrolytic capacitor.

It is preferable to form the conductive polymer layer of the cathode by electropolymerization. Electropolymerization enables a small amount of monomer to form a conductive polymer layer with excellent mechanical strength on the surface of the conductive substrate in a short period of time. Also, electropolymerization produces a thin, dense and even conductive polymer layer, and thus a suitable conductive polymer layer the thickness of which is within the range of 200 to 2450 nm can be obtained easily. On the other hand, a chemically polymerized film does not have an even quality. Further the chemically polymerized film is at least approximately 3 µm thick, and therefore the chemically polymerized film is not suitable to use for the downsizing of a capacitor. It should also be noted that the cumbersome processes of applying the dispersion liquid to the conductive substrate and drying the conductive substrate must be repeated to obtain a suitable conductive polymer layer that has a thickness within the range of 200 to 2450 nm. Moreover, for currently unknown reasons, the electrolytic capacitor having the cathode with the conductive polymer layer obtained from the dispersion liquid has been found to have a lower capacity and higher equivalent series resistance than the electrolytic capacitor having the cathode with the electropolymerized conductive polymer layer of the same thickness.

(2) Anode-Forming Step

The anode in the electrolytic capacitor of the present invention has a substrate composed of a valve metal such as aluminum, tantalum, niobium, titanium and zirconium, and a dielectric layer that is formed on the surface of the substrate and is composed of an oxide of the valve metal. As the substrate for the anode, a foil of a valve metal of which the surface area is increased by a heretofore known method of chemical or electrochemical etching is preferable, and an etched aluminum foil is especially preferable. The dielectric layer on the surface of the substrate can be formed with a heretofore method of applying a chemical conversion treatment to the substrate by use of a chemical conversion solution such as an aqueous ammonium borate solution, an aqueous ammonium adipate solution or an aqueous ammonium phosphate solution.

(3) Electrolyte-Filling Step

In this step, the cathode obtained through the cathode-forming step and the anode obtained through the anode-forming step are so placed and combined that the conductive polymer layer of the cathode and the dielectric layer of the anode face each other through a certain space, and then the space is filled with an ion-conductive electrolyte.

As the ion-conductive electrolyte, a heretofore known ion-conductive electrolyte that has no electron conductivity can be used without particular limitations. First, an electrolytic solution that is used for a conventional electrolyte capacitor, for example, an electrolytic solution in which a solute such as a phthalate salt, a salicylate salt, a benzoate salt, an adipate salt, an maleate salt and a borate salt is dissolved into a solvent such as γ-butyrolactone, δ-valerolactone, ethylene glycol, ethylene glycol monomethyl ether, sulfolane, propylene carbonate, acetonitrile and water can be used. Examples of the salt are an amidinium salt, imidazolinium salt, pyrimidinium salt, phosphonium salt, ammonium salt, amine salt, and alkali metal salt. The solvent of an electrolytic solution can be a single compound or a mixture of two kinds or more. Also, the solute of an electrolytic solution can be a single compound or a mixture of two kinds or more. These electrolytic solutions may contain a gelling agent. Moreover, an ambient-temperature molten salt (an ionic liquid) can be used as the ion-conductive electrolyte.

This step can be performed by, for example, impregnating a capacitor element, which is formed by laminating the cathode having a belt-like form and the anode having a belt-like form so that the conductive polymer layer of the cathode and the dielectric layer of the anode face each other by the interposition of a separator and winding the lamination, with the electrolytic solution or the ionic liquid. This step can also be performed by impregnating a capacitor element, which is formed by laminating the cathode in a desired form and the anode in a desired form so that the conductive polymer layer of the cathode and the dielectric layer of the anode face each other by the interposition of a separator, with the electrolytic solution or the ionic liquid. Moreover, a capacitor element, in which more than one pair of the cathode and the anode is alternately laminated so that the conductive polymer layer of the cathodes and the dielectric layer of the anodes face each other by the interposition of separators, can be impregnated with the electrolytic liquid or the ionic liquid. As the separator, woven cloth or non-woven cloth of a cellulose fiber, such as Manila paper, craft paper, esparto paper, hemp paper, cotton paper and mixed paper thereof, as well as synthetic fiber paper, glass paper, mixed paper comprised of glass paper and Manila paper or craft paper, etc., can be used. The impregnation of the electrolytic liquid or the ionic liquid may be performed after the capacitor element is housed in an armored case with an opening section. If an electrolyte containing a gelling agent is used, the electrolytic liquid can be made gel-like by impregnating the capacitor element with the electrolytic solution and then heating the capacitor element.

Also, this step can be performed by forming a capacitor element in which the conductive polymer layer of the cathode and the dialectic layer of the anode face each other by the interposition of an insulated spacer, and filling a space formed by the insulated spacer with the ion-conductive electrolyte. In this embodiment, a gel-like electrolyte obtained by absorbing the electrolytic solution in polyvinylidene fluoride, polyacrylonitrile or the like, or a solid-like electrolyte that is composed of a complex of the abovementioned salts and a polymer compound such as polyethylene oxide, polymethacrylate and polyacrylate, as well as the abovementioned electrolytic solution or ionic liquid, can be used. It is also possible to laminate a gel- or solid-like electrolyte onto the conductive polymer layer of the cathode and then laminate the anode onto this electrolyte in a manner such that the dielectric layer of the anode comes in contact with this electrolyte.

In the present invention, the conductive polymer layer of the cathode needs to be in direct contact with the ion-conductive electrolyte. The conductive polymer layer of the cathode is not in direct contact with the anode, rather it is connected (conducted) to the anode through the ion-conductive electrolyte. However, the dielectric layer of the anode can directly contact the ion-conductive electrolyte, or can be indirectly connected to the ion-conductive electrolyte via another conductive material. A conductive polymer layer can be used as the suitable conductive material. After forming the anode in the anode-forming step, this conductive polymer layer can be formed on the surface of the dielectric layer of the anode by an electropolymerization method or a chemical polymerization method, or by applying a dispersion liquid that contains at least particles of a conductive polymer and a dispersion medium on the surface of the dielectric layer of the anode and drying the anode. Further explanations on this conductive polymer layer are not given here because the abovementioned explanation about the formation of the conductive polymer layer of the cathode can be directly applied. If the conductive polymer layer is formed adjacent to the dielectric layer of the anode, this anode and the cathode are so placed and combined that the conductive polymer layer of the anode and the conductive polymer layer of the cathode face each other through a certain space, and then the space is filled with the ion-conductive electrolyte.

When a voltage is applied between the anode and the cathode of the capacitor element that is housed and sealed in an armored case, a redox capacity is expressed in the conductive polymer layer of the cathode that is in contact with the ion-conductive electrolyte, and therefore the capacity per unit volume of the electrolytic capacitor remarkably increases. While the redox capacity is expressed, an anion in the ion-conductive electrolyte is taken into the conductive polymer layer of the cathode as a dopant.

EXAMPLES

The present invention is explained with the following examples, but this invention is not limited to the following examples.

(1) Manufacture of Cathode and Evaluation of Capacity

Cathode 1

50 mL of distilled water was introduced into a glass receptacle and heated to 40 degrees centigrade. Then, 0.021 M of EDOT and 0.08 M of ammonium borodisalicylate were added in this order and agitated, and then a polymerization liquid for electropolymerization in which all EDOT was dissolved was obtained.

An aluminum foil with an aluminum oxide film was punched into a piece with a projected area of 1 cm$^2$ and an evaporated titanium film containing carbon was formed on the aluminum oxide film. This aluminum foil with the evaporated titanium film (substrate, working electrode) and a counter electrode of SUS mesh with an area of 10 cm$^2$ were introduced in the polymerization liquid for electropolymerization and galvanostatic electropolymerization was performed for 3 minutes under the condition of 100 µA/cm$^2$. The working electrode after polymerization was washed by water and dried for 30 minutes at 100 degrees centigrade, and a cathode in which the thickness of the PEDOT layer on the evaporated titanium film was 105 nm was obtained. The thickness of the PEDOT layer was obtained as follows. Galvanostatic electropolymerization experiments under the condition of 100 µA/cm$^2$ were carried out several times in different timings, and the numerical value of the thickness of the PEDOT layer obtained in each experiment was measured with an atomic force microscope or a step gauge. After the relational expression of the thickness of the PEDOT layer and the charge amount was introduced, the charge amount of electropolymerization was converted to the thickness of the PEDOT layer. In the following electropolymerization experiments, the same relational expression was used to calculate the thickness of the PEDOT layer.

Cathode 2

The manufacturing method for Cathode 1 was repeated except that galvanostatic electropolymerization was performed for 6 minutes under the condition of 100 µA/cm$^2$ instead of performing galvanostatic electropolymerization for 3 minutes under the condition of 100 µA/cm$^2$, and a cathode in which the thickness of the PEDOT layer on the evaporated titanium film was 210 nm was obtained.

Cathode 3

The manufacturing method for Cathode 1 was repeated except that galvanostatic electropolymerization was performed for 10 minutes under the condition of 100 µA/cm$^2$ instead of performing galvanostatic electropolymerization for 3 minutes under the condition of 100 µA/cm$^2$, and a cathode in which the thickness of the PEDOT layer on the evaporated titanium evaporated film was 350 nm was obtained.

Cathode 4

The manufacturing method for Cathode 1 was repeated except that galvanostatic electropolymerization was performed for 20 minutes under the condition of 100 µA/cm$^2$ instead of performing galvanostatic electropolymerization for 3 minutes under the condition of 100 µA/cm$^2$, and a cathode in which the thickness of the PEDOT layer on the evaporated titanium film was 700 nm was obtained.

Cathode 5

The manufacturing method for Cathode 1 was repeated except that galvanostatic electropolymerization was performed for 30 minutes under the condition of 100 µA/cm$^2$ instead of performing galvanostatic electropolymerization for 3 minutes under the condition of 100 µA/cm$^2$, and a cathode in which the thickness of the PEDOT layer on the evaporated titanium film was 1050 nm was obtained.

Cathode 6

The manufacturing method for Cathode 1 was repeated except that galvanostatic electropolymerization was performed for 50 minutes under the condition of 100 µA/cm$^2$ instead of performing galvanostatic electropolymerization for 3 minutes under the condition of 100 µA/cm$^2$, and a cathode in which the thickness of the PEDOT layer on the evaporated titanium evaporated film was 1750 nm was obtained.

Cathode 7

The manufacturing method for Cathode 1 was repeated except that galvanostatic electropolymerization was performed for 70 minutes under the condition of 100 µA/cm$^2$ instead of performing galvanostatic electropolymerization for 3 minutes under the condition of 100 µA/cm$^2$, and a cathode in which the thickness of the PEDOT layer on the titanium evaporated film was 2450 nm was obtained.

Cathode 8

The manufacturing method for Cathode 1 was repeated except that galvanostatic electropolymerization was performed for 100 minutes under the condition of 100 µA/cm$^2$ instead of performing galvanostatic electropolymerization for 3 minutes under the condition of 100 µA/cm$^2$, and a cathode in which the thickness of the PEDOT layer on the evaporated titanium film was 3500 nm was obtained.

Cathode 9

The manufacturing method for Cathode 1 was repeated except that galvanostatic electropolymerization was performed for 200 minutes under the condition of 100 µA/cm$^2$ instead of performing galvanostatic electropolymerization for 3 minutes under the condition of 100 µA/cm$^2$, and a cathode in which the thickness of the PEDOT layer on the evaporated titanium film was 7000 nm was obtained.

Figure 1:
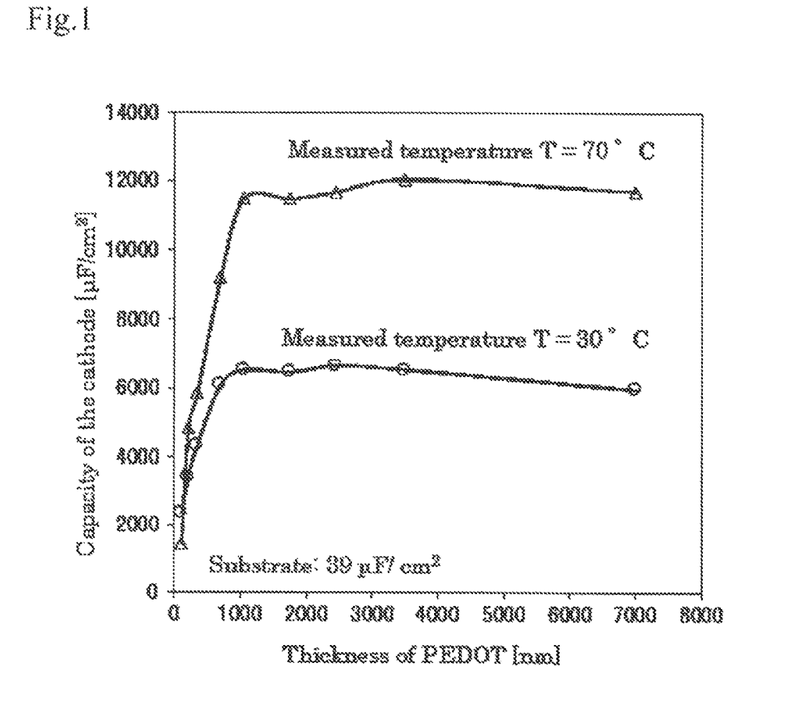
FIG. 1 shows the relationship between the film thickness and the capacity of a PEDOT electropolymerized film in the cathode.

Cathodes 1 to 9 were introduced into an electrolytic liquid in which the amidinium salt of phthalic acid was dissolved into γ-butyrolactone with the concentration of 15% by mass, and the capacity of each cathode at 120 Hz was measured under the condition of 30 degrees centigrade or 70 degrees centigrade. FIG. 1 shows the relationship between the thickness of the PEDOT layer and the capacity. The capacity of the aluminum foil with the evaporated titanium film (substrate) was 39 µF/cm$^2$.

FIG. 1 shows that, under the condition of 30 degrees centigrade or 70 degrees centigrade, the capacity increases until the thickness of the PEDOT layer reaches 1050 nm and that almost the same capacity is obtained if the thickness of the PEDOT layer is within the range of 1050 nm to 3500 nm, but if the thickness of the PEDOT layer exceeds 3500 nm the capacity slightly decreases. It was also found that each cathode shows a remarkably increased capacity compared with the substrate, and even Cathode 1 (PEDOT layer: 105 nm) has almost 60 times the capacity of the capacity of the substrate at 30 degrees centigrade.

Figure 2:
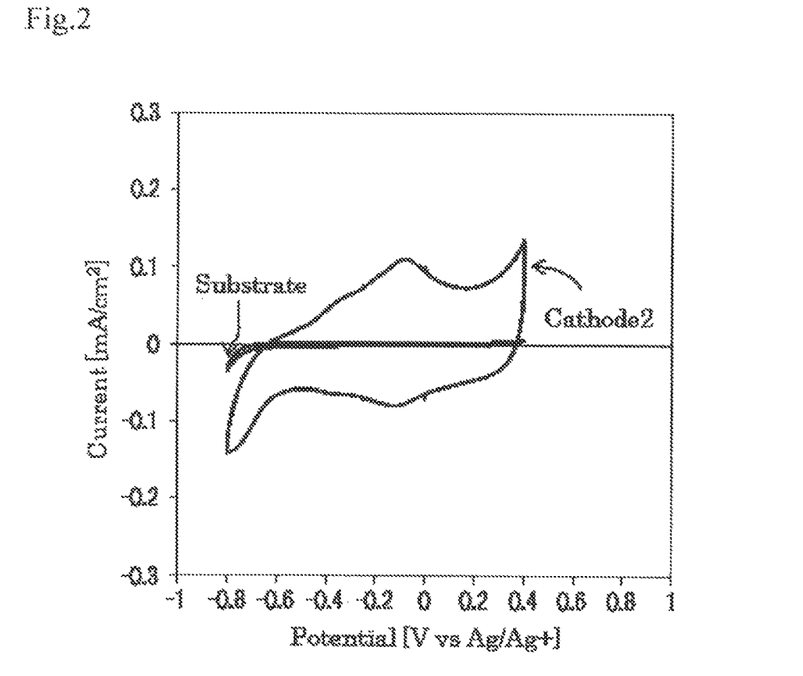
FIG. 2 shows a cyclic voltammogram of a cathode having a PEDOT electropolymerized film in an electrolytic solution.

To clarify the cause of the increased capacity of the cathode with a PEDOT layer, the electrochemical response of the cathode with the PEDOT layer was evaluated by cyclic voltammogram. Cathode 2 or the substrates as a working electrode, platinum mesh with an area of 4 cm$^2$ as a counter electrode, and a silver-silver chloride electrode as a reference electrode were introduced into the abovementioned electrolytic liquid, and an evaluation was made with a scanning potential range of −0.8 V to +0.4 V and a scanning rate of 10 mV/s. The result is shown in FIG. 2. As is evident from FIG. 2, the cyclic voltammogram of the substrate shows neither an oxidation wave nor a reduction wave, but the cyclic voltammogram of Cathode 2 shows an oxidation wave showing doping and a reduction wave showing dedoping in a very narrow range in the neighborhood of −0.1 V. This shows that a rapid charge-discharge reaction is occurring. Therefore, it was determined that the increase in the capacity of the cathode with a PEDOT layer was due to this expression of the redox capacity.

(2) Manufacture of Electrolytic Capacitor and Evaluation of Capacity

Example 1

50 mL of distilled water was introduced into a glass receptacle and heated to 40 degrees centigrade. Then, 0.021 M of EDOT and 0.08 M of ammonium borodisalicylate were added in this order and agitated, and then a polymerization liquid for electropolymerization in which all EDOT was dissolved was obtained. An aluminum foil with an aluminum oxide film was punched into a piece with a projected area of 2 cm$^2$, an evaporated titanium film containing carbon was formed on the aluminum oxide film, and a substrate for a cathode was obtained. Then, this cathode substrate (working electrode) and a counter electrode of SUS mesh with an area of 10 cm$^2$ were introduced into the polymerization liquid for electropolymerization and galvanostatic electropolymerization was performed for 3 minutes under the condition of 100 μA/cm$^2$. The working electrode after polymerization was washed by water and dried for 30 minutes at 100° C., and a cathode in which the thickness of the PEDOT layer on the evaporated titanium film was 105 nm was obtained.

By chemical conversion treatment, an aluminum oxide film was formed on the surface of an aluminum foil of which the surface area has been enhanced by etching, and then the aluminum foil was punched into a piece with a projected area of 2 cm$^2$ and an anode (capacity: 370 μF/cm$^2$) was obtained. Then, a capacitor element in which this anode and the cathode were laminated by the interposition of a cellulosic separator was formed, and this capacitor element was impregnated with an electrolytic liquid in which the amidinium salt of phthalic acid was dissolved into γ-butyrolactone with the concentration of 15% by mass, and packed with a laminated film. Then an aging treatment using a voltage of 2.9 V for 60 minutes at 110 degrees centigrade was applied, and a flat-plate electrolytic capacitor was formed. The capacity and the equivalent series resistance of this capacitor were measured under the condition of 120 Hz.

Example 2

The procedure of Example 1 was repeated except that galvanostatic electropolymerization was performed for 6 minutes under the condition of 100 μA/cm$^2$ instead of performing galvanostatic electropolymerization for 3 minutes under the condition of 100 μA/cm$^2$. The thickness of the PEDOT layer on the evaporated titanium film in the cathode was 210 nm.

Example 3

The procedure of Example 1 was repeated except that galvanostatic electropolymerization was performed for 10 minutes under the condition of 100 μA/cm$^2$ instead of performing galvanostatic electropolymerization for 3 minutes under the condition of 100 μA/cm$^2$. The thickness of the PEDOT layer on the evaporated titanium film in the cathode was 350 nm.

Example 4

The procedure of Example 1 was repeated except that galvanostatic electropolymerization was performed for 20 minutes under the condition of 100 μA/cm$^2$ instead of performing galvanostatic electropolymerization for 3 minutes under the condition of 100 μA/cm$^2$. The thickness of the PEDOT layer on the evaporated titanium film in the cathode was 700 nm.

Example 5

The procedure of Example 1 was repeated except that galvanostatic electropolymerization was performed for 30 minutes under the condition of 100 μA/cm$^2$ instead of performing galvanostatic electropolymerization for 3 minutes under the condition of 100 μA/cm$^2$. The thickness of the PEDOT layer on the evaporated titanium film in the cathode was 1050 nm.

Example 6

The procedure of Example 1 was repeated except that galvanostatic electropolymerization was performed for 50 minutes under the condition of 100 μA/cm$^2$ instead of performing galvanostatic electropolymerization for 3 minutes under the condition of 100 μA/cm$^2$. The thickness of the PEDOT layer on the evaporated titanium film in the cathode was 1750 nm.

Example 7

The procedure of Example 1 was repeated except that galvanostatic electropolymerization was performed for 70 minutes under the condition of 100 μA/cm$^2$ instead of performing galvanostatic electropolymerization for 3 minutes under the condition of 100 μA/cm$^2$. The thickness of the PEDOT layer on the evaporated titanium film in the cathode was 2450 nm.

Example 8

The procedure of Example 1 was repeated except that galvanostatic electropolymerization was performed for 100 minutes under the condition of 100 μA/cm$^2$ instead of performing galvanostatic electropolymerization for 3 minutes under the condition of 100 μA/cm$^2$. The thickness of the PEDOT layer on the evaporated titanium film in the cathode was 3500 nm.

Example 9

200 μL of commercially available aqueous dispersion liquid containing particles of a complex of PEDOT and polystyrene sulfonate ion (trade name: Baytron P, manufactured by H.C. Starck) was cast on the cathode substrate used in Example 1 and spin coating was carried out for 30 seconds at the rotation frequency of 3000 rpm. Then the cathode substrate was dried at 150 degrees centigrade for 30 minutes and a cathode in which the thickness of the PEDOT layer on the evaporated titanium film was about 100 nm was obtained. Then, a capacitor element in which the anode used in Example 1 and the cathode were laminated by the interposition of a cellulosic separator was formed, and this capacitor element was impregnated with the electrolytic liquid used in Example 1, and packed with a laminated film. Then, an aging treatment using a voltage of 2.9 V for 60 minutes at 110 degrees centigrade was applied, and a flat-plate electrolytic capacitor was formed. The capacity and the equivalent series resistance of this capacitor were measured under the condition of 120 Hz.

Example 10

200 μL of commercially available aqueous dispersion liquid containing particles of a complex of PEDOT and polystyrene sulfonate ion (trade name: Baytron P, manufactured by H.C. Starck) was cast on the cathode substrate used in Example 1 and spin coating was carried out for 30 seconds at the rotation frequency of 3000 rpm, and then the cathode substrate was dried at 150 degrees centigrade for 30 minutes. The process of casting and drying was repeated a further six times, and a cathode in which the thickness of the PEDOT layer on the evaporated titanium film was about 700 nm was obtained. Then the procedure of Example 9 was repeated except that this cathode was used in place of the cathode in Example 9.

Example 11

An ethanol solution containing EDOT with a concentration of 20% by mass was applied to the cathode substrate used in Example 1 and the cathode substrate was dried at an ambient temperature. Then an ethanol solution containing iron (III) p-toluenesulfonate with a concentration of 20% by mass as an oxidant was applied to the cathode substrate, and the cathode substrate was dried at room temperature for 10 minutes and then high-temperature treated. This chemical oxidative polymerization process was repeated, and a cathode in which the thickness of the PEDOT layer on the evaporation titanium film was approximately 5 μm was obtained. Then, a capacitor element in which the anode used in Example 1 and the cathode were laminated by the interposition of a cellulosic separator was formed, and this capacitor element was impregnated with the electrolytic liquid used in Example 1, and packed with a laminated film. Then, an aging treatment using a voltage of 2.9 V for 60 minutes at 110 degrees centigrade was applied, and a flat-plate electrolytic capacitor was formed. The capacity and the equivalent series resistance of this capacitor were measured under the condition of 120 Hz.

Example 12

50 mL of distilled water was introduced into a glass receptacle, and at room temperature, 0.5 M of pyrrole and 0.08 M of ammonium borodisalicylate were added in this order and agitated, and then a polymerization liquid for electropolymerization in which all pyrrole was dissolved was obtained. An aluminum foil with an aluminum oxide film was punched into a piece with a projected area of 2 cm$^2$, an evaporated titanium film containing carbon was formed on the aluminum oxide film, and a substrate for a cathode was obtained. Then, this cathode substrate (working electrode) and a counter electrode of SUS mesh with an area of 10 cm$^2$ were introduced into the polymerization liquid for electropolymerization and galvanostatic electropolymerization was performed for 10 minutes under the condition of 100 μA/cm$^2$. The working electrode after polymerization was washed by water and dried for 30 minutes at 100 degrees centigrade, and a cathode in which the thickness of the polypyrrole layer on the evaporated titanium film was 350 nm was obtained. Then, a capacitor element in which the anode used in Example 1 and the cathode were laminated by the interposition of a cellulosic separator was formed, and this capacitor element was impregnated with the electrolytic liquid used in Example 1 and packed with a laminated film. Then, an aging treatment using a voltage of 2.9 V for 60 minutes at 110 degrees centigrade was applied, and a flat-plate electrolytic capacitor was formed. The capacity and the equivalent series resistance of this capacitor were measured under the condition of 120 Hz.

Comparative Example 1

A capacitor element in which the cathode substrate used in Example 1 and the anode used in Example 1 were laminated by the interposition of a cellulosic separator was formed, and this capacitor element was impregnated with the electrolytic liquid used in Example 1 and packed with a laminated film. Then, an aging treatment using a voltage of 2.9 V for 60 minutes at 110 degrees centigrade was applied, and a flat-plate electrolytic capacitor was formed. The capacity of this capacitor was measured under the condition of 120 Hz.

Comparative Example 2

An etched aluminum foil was punched into a piece with a projected area of 2 cm$^2$, and a cathode was formed. Then, a capacitor element in which this cathode and the anode used in Example 1 were laminated by the interposition of a cellulosic separator was formed, and this capacitor element was impregnated with the electrolytic liquid used in Example 1 and packed with a laminated film. Then, an aging treatment using a voltage of 2.9 V for 60 minutes at 110 degrees centigrade was applied, and a flat-plate electrolytic capacitor was formed. The capacity and the equivalent series resistance of this capacitor were measured under the condition of 120 Hz.

Comparative Example 3

An etched aluminum foil was punched into a piece with a projected area of 2 cm$^2$, then titanium was vacuum-deposited in a nitrogen atmosphere, and a cathode was formed. Then, a capacitor element in which this cathode and the anode used in Example 1 were laminated by the interposition of a cellulosic separator was formed, and this capacitor element was impregnated with the electrolytic liquid used in Example 1 and packed with a laminated film. Then, an aging treatment using a voltage of 2.9 V for 60 minutes at 110 degrees centigrade was applied, and a flat-plate electrolytic capacitor was formed. The capacity of this capacitor was measured under the condition of 120 Hz.

Table 1 collectively shows the capacity (Cap) values and equivalent series resistance (ESR) values obtained.

TABLE 1

| | Monomer | Polymerization | Thickness of polymer layer [nm] | Cap [μF] | ESR [Ω] |
|---|---|---|---|---|---|
| Example 1 | EDOT | electropolymerization | 105 | 291 | 1.95 |
| Example 2 | EDOT | electropolymerization | 210 | 330 | 1.68 |
| Example 3 | EDOT | electropolymerization | 350 | 337 | 1.49 |
| Example 4 | EDOT | electropolymerization | 700 | 349 | 1.18 |
| Example 5 | EDOT | electropolymerization | 1050 | 355 | 1.08 |
| Example 6 | EDOT | electropolymerization | 1750 | 363 | 1.06 |
| Example 7 | EDOT | electropolymerization | 2450 | 364 | 0.95 |
| Example 8 | EDOT | electropolymerization | 3500 | 355 | 1.21 |
| Example 9 | EDOT | dispersion liquid | 100 | 230 | 8.75 |
| Example 10 | EDOT | dispersion liquid | 700 | 303 | 2.75 |
| Example 11 | EDOT | chemical polymerization | 5000 | 369 | 1.07 |
| Example 12 | pyrrole | electropolymerization | 350 | 338 | 0.91 |
| Comparative Example 1 | — | — | — | 35 | — |
| Comparative Example 2 | — | — | — | 200 | 0.99 |
| Comparative Example 3 | — | — | — | 208 | — |

As is evident from Table 1, the electrolytic capacitors in Examples 1 to 8 that have a cathode with a PEDOT layer obtained from electropolymerization show a remarkably increased capacity compared with the conventional electrolytic capacitors in Comparative Examples 2 and 3 and show a tendency to enhance the capacity of the capacitors in accordance with the increase in the thickness of the PEDOT layer. This result corresponds well with the result shown in FIG. 1, indicating that the increase in the capacity of the capacitor derives from the redox capacity of the cathode. With regards to the equivalent series resistance of the electrolytic capacitors, the electrolytic capacitors in Examples 1 to 8 show values that are equivalent to or larger than the value of equivalent series resistance in the conventional electrolytic capacitor in Comparative Example 2, and show a tendency that equivalent series resistance decreases as the thickness of a PEDOT layer increases until the thickness reaches 2450 nm, but equivalent series resistance also increases when the thickness is further increased. Incidentally, the value of equivalent series resistance in the capacitor of Example 1 gives no practical disadvantage. Also, the electrolytic capacitor in Example 12 that has a cathode with a polypyrrole layer obtained from electropolymerization shows the same level of capacity and lower equivalent series resistance compared with the electrolytic capacitor in Example 3 that has a cathode with a PEDOT layer with the same thickness.

The electrolytic capacitors in Examples 9 and 10 that have a cathode with a PEDOT layer obtained from a dispersion liquid show increased capacity compared with the conventional electrolytic capacitors in Comparative Examples 2 and 3, but show lower capacity compared with the electrolytic capacitors in Examples 1 and 4, which have a cathode with a PEDOT layer with the same thickness. Also, the equivalent series resistance of the electrolytic capacitors in Examples 9 and 10 is remarkably increased in comparison with the equivalent series resistance of the electrolytic capacitors in Examples 1 and 4. The electrolytic capacitor in Example 11 that has a cathode with a PEDOT layer obtained from chemical polymerization shows the biggest capacity, however this example is not suitable for manufacturing a small electrolytic capacitor because this example has a thick cathode. In light of these results, it was determined that the formation of a conductive polymer layer of a cathode by electropolymerization is effective.

A high temperature load test under a charge of 2.5 V at 105 degrees centigrade was performed for 140 hours on the electrolytic capacitors of Examples 1 to 5 that have a cathode with a PEDOT layer obtained from electropolymerization and are suitable for manufacturing a small, high-capacity electrolytic capacitor. Table 2 shows the change ratio of the capacity after the load test against the capacity before the load test.

TABLE 2

| | ΔCap [%] |
|---|---|
| Example 1 | −10.0 |
| Example 2 | −3.2 |
| Example 3 | −2.0 |
| Example 4 | −1.6 |
| Example 5 | −1.5 |

From Table 2, it can be seen that the electrolytic capacitor of Example 1 that has a cathode with a PEDOT layer with the thickness of 105 nm shows a large change in capacity. However, the capacity change ratio of the electrolytic capacitor of Example 2 that has a cathode with a PEDOT layer with the thickness of 210 nm is around −3%, and the capacity change ratios of the electrolytic capacitor of Example 3 that has a cathode with a PEDOT layer with the thickness of 350 nm, the electrolytic capacitor of Example 4 that has a cathode with a PEDOT layer with the thickness of 700 nm and the electrolytic capacitor of Example 5 that has a cathode with a PEDOT layer with the thickness of 1050 nm are around −2%, which shows that the electrolytic capacitors of these examples have sufficient heat resistance.

Figure 3:
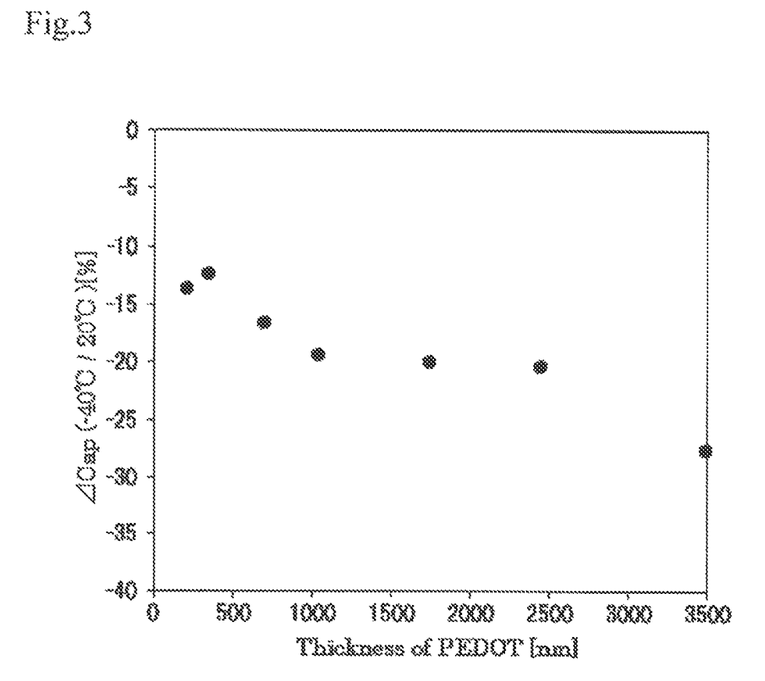
FIG. 3 shows the relationship between the film thickness of a PEDOT electropolymerized film of a cathode and the change in the capacitor capacity due to temperature changes in an electrolytic capacitor.
Figure 4:
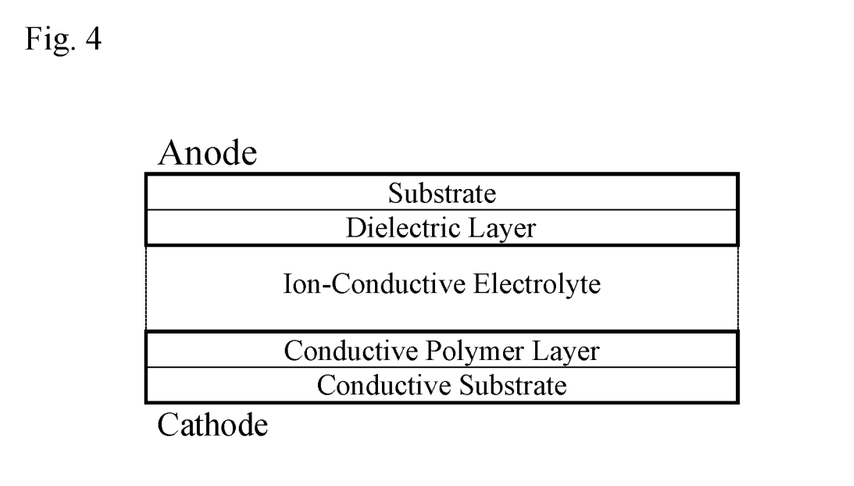
FIG. 4 schematically illustrates an embodiment of an electrolytic capacitor of the present invention.
Figure 5:
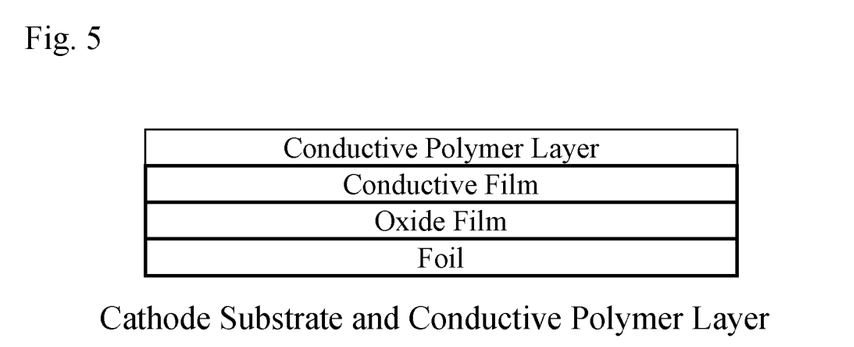
FIG. 5 schematically illustrates an embodiment of a substrate of a cathode in the present invention.

Then, for the electrolytic capacitors of Examples 1 to 8, which have a cathode with a PEDOT layer obtained from electrolytic polymerization and which are suitable for manufacturing a small and high-capacity electrolytic capacitor, the capacity value at −40 degrees centigrade (Cap (−40° C.)) and the capacity value at 20 degrees centigrade (Cap (20° C.)) were measured under the condition of 120 Hz, and the ratio of {Cap (−40° C.)−Cap (20° C.)} against Cap (20° C.) (this ratio is shown in the figure as "ΔCap (−40° C./20° C.)") was employed as a measure to study the temperature dependency of the capacity. The result obtained is shown in FIG. 3. As the absolute value of ΔCap (−40° C./20° C.) increases, the temperature dependence of the capacity becomes larger. As is evident from FIG. 3, the temperature dependence of the capacity increases when the thickness of a PEDOT layer exceeds 2450 nm.

Therefore, the results shown in Table 2 and FIG. 3 lead to the conclusion that the thickness of the conductive polymer layer is preferably within the range of 200 to 2450 nm.

INDUSTRIAL APPLICABILITY

The present invention produces an electrolytic capacitor that is compact and has a large capacity.

What is claimed is:
1. An electrolytic capacitor comprising:
 a cathode comprising a conductive substrate and a conductive polymer layer placed on a surface of the conductive substrate;
 an anode comprising a substrate composed of a valve metal and a dielectric layer composed of an oxide of the valve metal that is placed on a surface of the substrate and is so placed that the dielectric layer and the conductive polymer layer of the cathode face each other through a space; and an ion-conductive electrolyte filled in the space, wherein the conductive substrate of the cathode has a foil shape, the conductive polymer layer of the cathode is an electropolymerized film having a thickness of 200 to 2450 nm, the substrate of the anode has a foil shape, the ion-conductive electrolyte in contact with the conductive polymer layer of the cathode has no electron conductivity, and the conductive polymer layer of the cathode that is in contact with the ion-conductive electrolyte expresses a redox capacity when a voltage is applied between the anode and the cathode in using the electrolytic capacitor.

2. The electrolytic capacitor according to claim 1, wherein the conductive substrate of the cathode comprises: a foil composed of a valve metal; an oxide film composed of an oxide of the valve metal that is placed on a surface of the foil and that is naturally oxidized or formed by chemical conversion treatment; and a conductive film composed of a conductive material selected from a group consisting of carbon, titanium, platinum, gold, silver, cobalt, nickel and iron that is placed on a surface of the oxide film, and the conductive polymer layer of the cathode is placed on a surface of the conductive film.

3. The electrolytic capacitor according to claim 2, wherein the conductive film is an evaporated titanium film comprising nitrogen or carbon.

4. The electrolytic capacitor according to claim 2, wherein the foil composed of a valve metal is an aluminum foil.

5. The electrolytic capacitor according to claim 4, wherein the thickness of the conductive polymer layer of the cathode is within a range of 1050 to 2450 nm.

6. The electrolytic capacitor according to claim 2, wherein the thickness of the conductive polymer layer of the cathode is within a range of 1050 to 2450 nm.

7. The electrolytic capacitor according to claim 1, wherein the thickness of the conductive polymer layer of the cathode is within a range of 1050 to 2450 nm.

8. The electrolytic capacitor according to claim 1, wherein the conductive polymer layer of the cathode is composed of poly(3,4-ethylenedioxythiophene).

9. The electrolytic capacitor according to claim 8, wherein the conductive polymer layer of the cathode has a borodisalicylic anion as a dopant.

10. A method for preparing the electrolytic capacitor according to claim 8 comprising:

a cathode-forming step of forming the conductive polymer layer having a thickness of 200 to 2450 nm by electropolymerization on a surface of the conductive substrate having a foil shape for obtaining a cathode for the electrolytic capacitor;

an anode-forming step of oxidizing a surface of the substrate composed of a valve metal and having a foil shape to form the dielectric layer composed of an oxide of the valve metal for obtaining an anode for the electrolytic capacitor; and an electrolyte-filling step of making the conductive polymer layer of the cathode and the dielectric layer of the anode face each other through a space and filling the ion-conductive electrolyte having no electron conductivity in the space.

11. The method for preparing an electrolytic capacitor according to claim 10, wherein the conductive substrate used in the cathode-forming step comprises: a foil composed of a valve metal; an oxide film composed of an oxide of the valve metal that is placed on a surface of the foil and that is naturally oxidized or formed by chemical conversion treatment; and a conductive film composed of a conductive material selected from a group consisting of carbon, titanium, platinum, gold, silver, cobalt, nickel and iron that is placed on a surface of the oxide film, and the conductive polymer layer is formed on a surface of the conductive film in the cathode-forming step.

12. The method for preparing an electrolytic capacitor according to claim 11, wherein the conductive film is prepared by a method selected from a group consisting of vacuum deposition, sputtering, ion plating and coating.

13. The method for preparing an electrolytic capacitor according to claim 11, wherein the conductive film is an evaporated titanium film comprising nitrogen or carbon.

14. The method for preparing an electrolytic capacitor according to claim 11, wherein the foil composed of a valve metal is an aluminum foil.

15. The method for preparing an electrolytic capacitor according to claim 11, wherein the conductive polymer layer having a thickness of 1050 to 2450 nm is formed in the cathode-forming step.

16. The method for preparing an electrolytic capacitor according to claim 10, wherein the conductive polymer layer composed of poly(3,4-ethylenedioxythiophene) is formed in the cathode-forming step.

17. The method for preparing an electrolytic capacitor according to claim 16, wherein a supporting electrolyte selected from a group consisting of borodisalicylic acid and a salt thereof is used in the cathode-forming step.

18. The method for preparing an electrolytic capacitor according to claim 10, wherein the conductive polymer layer having a thickness of 1050 to 2450 nm is formed in the cathode-forming step.

* * * * *